United States Patent [19]
Ackeret

[11] 3,994,551

[45] Nov. 30, 1976

[54] HOLDERS FOR TAPE CASSETTES

[75] Inventor: Peter Ackeret, Kusnacht, Switzerland

[73] Assignee: IDN Inventions and Development of Novelties AG, Lenzerheide, Switzerland

[22] Filed: May 30, 1975

[21] Appl. No.: 582,128

[30] Foreign Application Priority Data
June 5, 1974  Germany............................ 2427105

[52] U.S. Cl............................... 312/319; 206/387; 312/111
[51] Int. Cl.²........................................ A47B 88/00
[58] Field of Search ............. 312/19, 108, 111, 319, 312/208; 206/387

[56] References Cited
UNITED STATES PATENTS

| | | | |
|---|---|---|---|
| 3,272,325 | 9/1966 | Schoenmakers...................... | 206/52 |
| 3,506,321 | 4/1970 | Hampel............................... | 312/111 |
| 3,594,053 | 7/1971 | Winkens............................. | 312/208 |
| 3,677,396 | 7/1972 | Staar.............................. | 206/387 R |
| 3,899,229 | 8/1975 | Ackeret............................. | 206/387 |
| 3,904,259 | 9/1975 | Hoffmann et al................... | 312/219 |

Primary Examiner—Casmir A. Nunberg
Attorney, Agent, or Firm—H. Dale Palmatier

[57] ABSTRACT

A holder for a tape cassette including a substantially flat elongate and thin housing having one narrow side open to admit entrance of the cassette, a leaf spring within the housing opposite the entrance to bear directly against the cassette for thrusting the cassette outwardly, a latch molded integrally of the housing and forming a part of one wall of the housing to retain the cassette, and tape reel holding cams spring pressed into the interior of the housing for insertion into the reel hubs of the cassette.

3 Claims, 4 Drawing Figures

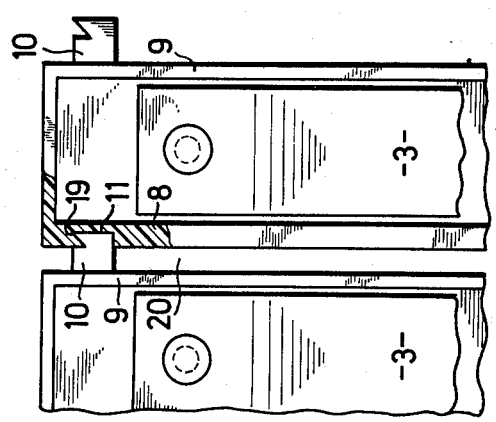
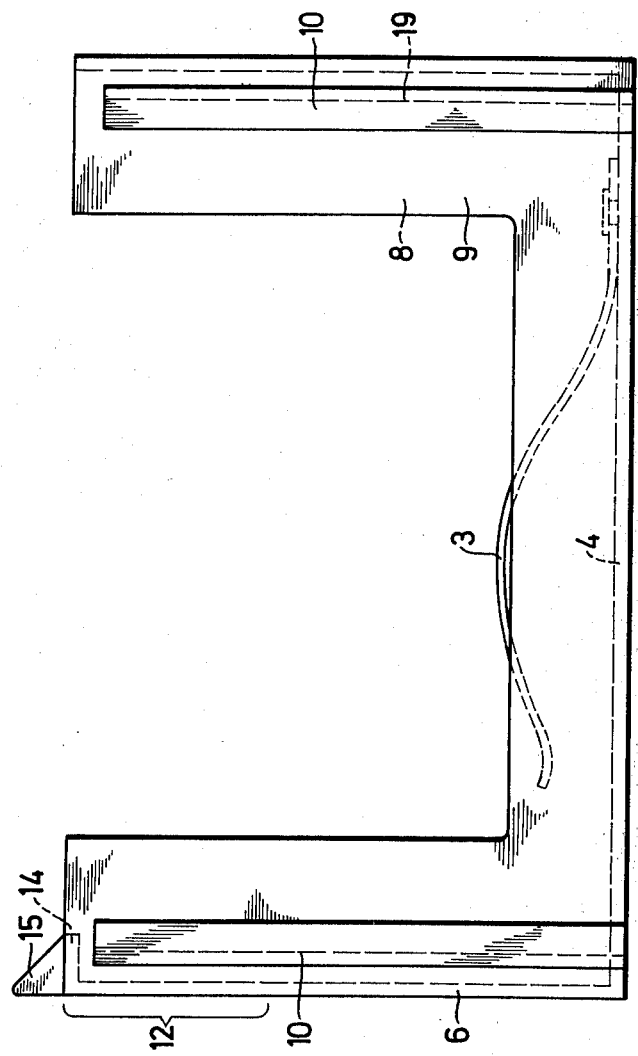
Fig. 4
Fig. 3

HOLDERS FOR TAPE CASSETTES

The invention relates to holders for tape cassettes, for example magnetic tape cassettes, and the like, consisting of a housing which encloses the cassette on five of its six sides and has an entrance on the sixth side, an ejector device which holds the cassette under pre-tension in the direction of the housing aperture, and a locking means to hold the cassette in the housing.

Holders of this type are already known and are constructed after the manner of a drawer, the cassette being inserted in a slider which is subjected to pre-tension by the ejector device. When the locking means is released, the slider slides with the cassette towards the entrance and is arrested by stops. Several holders of this type may be interlocked to form stacking blocks, and the tape coils of the cassette may be secured by means of cams or the like which are moulded on the slider.

The object of the invention is to provide a holder with the features mentioned initially which will be more economic with regard to manufacturing costs than the known holder.

According to the invention the ejector device is a leaf spring fixed inside the housing opposite the entrance and acting directly on the cassette, the locking means being an extension moulded on the housing in one piece which engages behind the cassette when it is pushed in and which can be moved out of the locking position.

It can be seen that due to this construction both the housing and the ejector device can be very simple, so that the manufacturing costs are low. Special guide means and stops for the spring which acts as ejector device may be omitted.

Embodiments of the invention will now be described in greater detail with reference to the accompanying drawings, of which:

FIG. 3 is an elevation of another embodiment of the invention, and FIG. 4 is a partial view, seen in the direction of the arrow "4" in FIG. 2.

Figure 1:
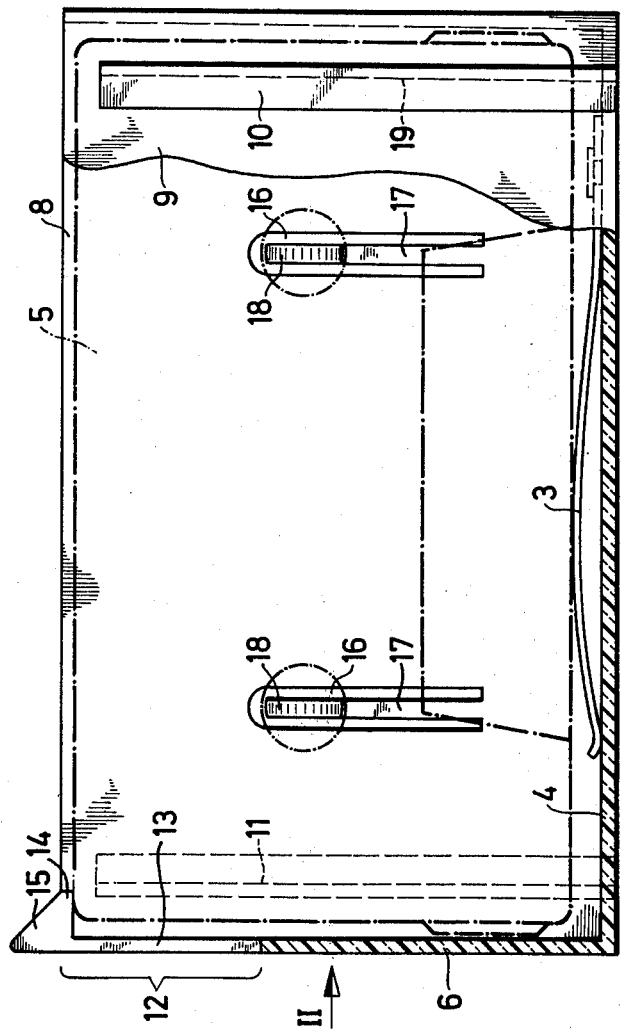
FIG. 1 is a longitudinal section through a first embodiment of the invention.

The holder is in the shape of a housing which is open on a longer, narrow side to provide an entrance, and is of one-piece construction. The housing consists substantially of an injection-moulded part of a plastics material, preferably polystyrole. A leaf spring 3 is rivetted onto the surface of the base section 4 nearest to the entrance in the housing for a cassette 5. The leaf spring 3 is approximately arc-shaped in the unstressed state, but the stress state is shown in FIG. 1 and the unstressed state is shown in FIG. 3.

The side wall 8 of the housing has apertures 16 extending lengthwise in the insertion direction of the cassette 5 and have a cam support 17 moulded onto the end nearest the spring 3 in each case. At the free end of the cam support 17 there is a cam 18 which is approximately semi-circular in shape (cf. FIG. 2). When the cam supports are in the rest position, they lie in the plans of the side wall 8, and are resiliently deflectable.

The narrow end wall 6 of the holder has adjacent slots 12 near the side walls 8, 9, so that a tongue 13 is produced. The tongue 13 carries on its free end a lug 14 and a key 15. The lug serves to secure the inserted cassette 5 in the holder counter to the pressure of the spring 3, whilst it can be freed by lateral deflection of the tongue 13 — for example by means of finger pressure on the key 15.

The side walls 8 and 9 are provided with means for stacking several similar holders. The end wall 9, for this purpose, carries near narrow end walls strips 10 on which a dovetail guide 19 is formed, whilst the side wall 8 has grooves 11 which correspond to the guide 19. In this way, when holders are joined together gaps 20 are formed, which are determined by the height of the strips 10 and make it possible for the cams 18 to yield, as indicated by dash-dotted lines in FIG. 2, when the cassette 5 is pushed in or removed. The profile can be seen in FIG. 4.

Figure 2:
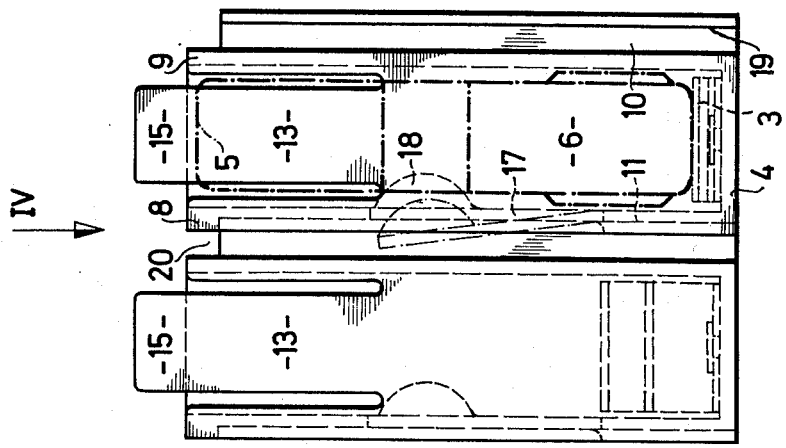
FIG. 2 is a view in the direction of the arrow "2" in FIG. 1, showing the holder stacked to form a block with a further, similar holder which is cut off.

The embodiment shown in FIG. 3 differs from that shown in FIGS. 1, 2 and 4 in that large sections are left out of the walls 8, 9, thus producing a considerable extra saving in material; the housing therefore has only rudimentary walls in the region of the large cassette surfaces and resembles rather a U-shaped rail with U-profile. When stacking, no distance corresponding to the gap 20 is necessary in this case; however, account must be taken of the disadvantage that the tape coils of the cassette cannot be locked.

1. A holder for tape cassettes and the like, consisting of a housing for receiving the cassette, the housing having an entrance through which a cassette is inserted, an ejector device which holds the cassette under pretension in the direction of the entrance, and a locking means to hold the cassette when pushed into the housing, in which the ejector device is a leaf spring fixed inside the housing opposite the entrance and acting directly on the cassette and in which the locking means includes an elongate tongue formed integrally of and in one piece with one side wall of the housing, the tongue being yieldable to permit flexing relative to the side wall and having a transversely extending lug projecting across a significant portion of the entrance to obstruct the passage of the cassette and to engage behind the cassette when it is pushed in and can be displaced outwardly from the entrance to release the cassette.

2. A holder according to claim 1, wherein said housing has a rectangular configuration, approximating the configuration of the cassette, and said housing having broad and narrow side walls to respectively confront the sides and ends of the cassette, said one side wall comprising a narrow side wall and confronting one end of the cassette adjacent one end portion of the entrance, said broad side walls of the housing having stacking means for the connection together of several similar holders to form a block wherein said broad side walls of adjacent housings confront each other.

3. A holder according to claim 2 in which there are resiliently deflectable tape coils securing cams in such broad side walls on the housing said stacking means including rigid spacer strips on said broad side walls to maintain the broad side walls of the next adjacent housings in the stack in spaced relation to each other, and accommodating deflection of such cams as the cassettes are inserted and withdrawn from the housing.

* * * * *